United States Patent [19]
Rosen et al.

[11] Patent Number: 6,065,057
[45] Date of Patent: May 16, 2000

[54] METHOD FOR AUTHENTICATING MODIFICATION OF A CURSOR IMAGE

[75] Inventors: James Samuel Rosen, New York, N.Y.; Thomas A. Schmitter, Charlestown, Mass.; Mark S. Hall, South Orange, N.J.

[73] Assignee: Comet Systems, Inc., New York, N.Y.

[21] Appl. No.: 09/358,612

[22] Filed: Jul. 21, 1999

Related U.S. Application Data

[62] Division of application No. 08/882,580, Jun. 25, 1997.

[51] Int. Cl.[7] .................................................. G06F 15/16
[52] U.S. Cl. .......................... 709/229; 709/227; 709/203; 345/339
[58] Field of Search ................................... 709/229, 227, 709/203; 713/201, 200; 345/329, 334, 335, 339, 341

[56] References Cited

U.S. PATENT DOCUMENTS

| | | | |
|---|---|---|---|
| 4,672,575 | 6/1987 | Stephens | 364/900 |
| 4,841,291 | 6/1989 | Swix et al. | 340/725 |
| 4,984,152 | 1/1991 | Muller | 364/200 |
| 5,157,768 | 10/1992 | Hoeber et al. | 395/157 |
| 5,179,656 | 1/1993 | Lisle | 395/159 |
| 5,347,628 | 9/1994 | Brewer et al. | 395/159 |
| 5,544,295 | 8/1996 | Capps | 395/152 |
| 5,559,943 | 9/1996 | Cyr et al. | 395/155 |
| 5,559,947 | 9/1996 | Wugofski | 345/334 |
| 5,559,948 | 9/1996 | Bloomfield et al. | 345/335 |
| 5,572,643 | 11/1996 | Judson | 395/793 |
| 5,596,694 | 1/1997 | Capps | 395/152 |
| 5,710,897 | 1/1998 | Schneider | 395/334 |
| 5,737,619 | 4/1998 | Judson | 395/761 |
| 5,740,549 | 4/1998 | Reilly et al. | 705/14 |
| 5,801,698 | 9/1998 | Vection et al. | 345/347 |
| 5,841,970 | 11/1998 | Tabuki | 709/229 |
| 5,923,327 | 7/1999 | Smith et al. | 345/341 |
| 5,945,989 | 8/1999 | Freishtat et al. | 345/329 |
| 5,959,624 | 9/1999 | Johnston, Jr. et al. | 345/334 |
| 5,987,134 | 11/1999 | Shin et al. | 709/229 |
| 5,990,888 | 11/1999 | Blades et al. | 345/339 |

OTHER PUBLICATIONS

*The Java Language Environment—May 1995, A White Paper*, by James Gosling and Henry McGilton (65 pp.)
*WWW Plug–Ins Companion*, Written by Mark R. Brown with Simeon M. Greene, Galen Grimes, John Jung, Bernie Roehl, David Wall and Joe Weber, (21 pp.), 1996.

*Primary Examiner*—Zarni Maung
*Assistant Examiner*—Philip B. Tran
*Attorney, Agent, or Firm*—Weingarten, Schurgin, Gagnebin & Hayes LLP

[57] ABSTRACT

A system for modifying a cursor image, as displayed on a video monitor of a remote terminal, to a specific image having a desired shape and appearance. The system stores cursor image data corresponding to the specific image, and a cursor display code. The cursor display code contains information in response to which the cursor image is modified to the specific image. A server computer transmits specified information to the remote terminal. The information includes at least one cursor display instruction. The cursor display instruction is operable to modify, in conjunction with the cursor information and the cursor image data, a cursor image displayed by a display of the remote terminal in the shape and appearance of the specific image.

23 Claims, 9 Drawing Sheets

```
<OBJECT
    202.ID=cc1
    203.TYPE="application/x-oleobject"
    204.CLASSID="clsid:CB005660-D0C7-11cf-B7F6-00AA00A3F278"
    205.CODEBASE="http://cometsystems.com/controls/cc.cab#ver=4,70,
       0,1122"
    206.<PARAM NAME="CursorType" VALUE="1"
    207.<PARAM NAME="CursorImage"
       VALUE="http://cometsystems.com/library/images/acme.cur">
    208.<PARAM NAME="Counter" VALUE="http://
       cometsystems.com/accounting">
    209.<PARAM NAME="DisplayDuration" VALUE="5">
    210.<PARAM NAME="CacheCursor" VALUE="1">
    211.<PARAM NAME="ServerSignature" VALUE="54F5254A23BD988AB54">
    212.<PARAM NAME="DormantDelay" VALUE="600">
    213.<PARAM NAME="CursorTrajectoryMap" VALUE="http://
       cometsystems.com/maps/trajectory">
    214.<PARAM NAME="CursorPositionMap" VALUE="http://
       cometsystems.com/maps/position">
    215.<PARAM NAME="CursorVelocityMap"
       VALUE="http://cometsystems.com/maps/velocity">
    216.<PARAM NAME="CursorPositionMap" VALUE="http://
       cometsystems.com/maps/velocity">
    217.<PARAM NAME="CursorButtonMap" VALUE="http://
       cometsystems.com/maps/buttonstate">
    218.<PARAM NAME="ContentType" VALUE="5">
    219.<PARAM NAME="PriorityLevel" VALUE="1">
    220.<PARAM NAME="StreamBufferSize" VALUE="0">
    221.<PARAM NAME="SatelliteImage"
       VALUE="http://cometsystems.com/library/images/acmesat.bmp">
    222.<PARAM NAME="SatelliteXDisplacement" VALUE="-50">
    223.<PARAM NAME="SatelliteYDisplacement" VALUE="50">
    224.<PARAM NAME="ExtraDisplayParameters"
       VALUE="http://cometsystems.com/library/params/acme.prm">
</OBJECT>
```

*FIG. 4*

```
<script language="VBScript">
<!--\1`;
302.Sub window_onLoad()
303.    ccl.RememberCurrentCursor()
304.    ccl.SetNormalCursor("http://cometsystems.com/library/
            images/acme.cur")
305.end sub 306.Sub window_onUnload()
307.    ccl.Reset()
308.end sub
-->
</script>
```

*FIG. 5*

METHOD FOR AUTHENTICATING MODIFICATION OF A CURSOR IMAGE

This application is a division of Ser. No. 08/882,580 filed Jun. 25, 1997.

FIELD OF THE INVENTION

This invention relates to computer networks and software, and more particularly, to a server system capable of modifying a cursor image displayed on a remote client computer.

BACKGROUND OF THE INVENTION

The World Wide Web ("WWW" or "web") and online services such as America Online, in conjunction with faster and more powerful personal computers, have rendered the Internet and other interactive online computer networks accessible to millions of people all over the world. Concomitant with the emergence of this new communication medium, digital content providers have proliferated, providing online news, entertainment, games and all sorts of other content. As with other mass mediums, such as television, radio, and print publications, the entities that create such content seek to offset their expenses by selling advertising. With reference to the WWW, online advertising has become a multimillion dollar business, to the amount of approximately $300 million dollars in 1996.

The most common type of online advertisement exists in the form of "banner advertisements". Users of online services routinely encounter banner ads on the top, sides, and/or bottom of their video monitor screens when viewing a web page. Banner ads are generally square or rectangular boxes provided with some combination of graphics, color and text directed to the product or service being advertised. As such, the intention of these banner advertisements is to create impressions among online users and to convey some advertising message and/or logo. Banner ads are usually provided on a web page in the form of a "hyperlink", in which users who yield to the advertisement's solicitation to "Click Here" are transported to the web site of the manufacturer of the product or service being advertised, or to some other screen which provides additional information about the product or service.

Unfortunately, banner ads occupy only a small portion of a web page. As the user scrolls down a page the banner ad disappears. Although online advertisers and content publishers have attempted to optimize the visibility of banner advertisements by placing them on a popular web page where they will have a greater chance of being seen, Internet users, nevertheless, can easily ignore or find ways to remove and eliminate from their view the banner ads which exist on the web pages they are viewing. As such, the banner ads are rendered ineffective in their aim to provide information about a product or service. Additionally, money spent to advertise a product may be wasted if users are able to ignore or remove the advertisements from the web pages they are viewing.

Another method of online advertising involves the use of "frames" on a web page. Frames are a feature supported by the recent versions of leading web navigating programs known as browsers, such as Netscape Navigator® and Microsoft's Internet Explorer®. Frames generally divide up a user's screen so that the user can, for example, independently scroll down each of numerous frames which appear on the web page being viewed on the user's screen. Like banner advertisements, frames can be aesthetically unappealing as well as confusing to the user. Additionally, placement of advertising frames on a web page generally results in cramping or decreasing the size of the main content frame which oftentimes renders the content in the main frame difficult to read. As a result, users have developed ways to reduce the size or even eliminate frames from the web page being viewed.

Another type of online advertising involves the self-appearing window which generally appears on its own as a user is using the Internet or browsing on the WWW. Such advertisements are relatively easy for a user to avoid as a user may simply re-size the window to make it smaller, drag another window or object in front of it to obscure it from view, close the advertising window, or simply ignore it and continue with the task being undertaken online. Recently, online advertisers have begun using self-appearing screens which are delivered via dialog boxes which dominate the main part of the screen. Although these dialog boxes can be removed when the user clicks on the appropriate place(s) on the dialog box, the self-appearing dialog boxes have a much higher rate of being seen by users. This follows because the dialog boxes take control of the user's screen for a preset amount of time and/or until the user clicks on the appropriate place(s) to make the dialog box disappear. The recent prevalence in the use of self-appearing dialog box advertising has resulted in a more intrusive method of advertising which has resulted in resentment among users who are accustomed to more passive online advertising methods such as the frames and banner advertisements which are more easily avoided and/or ignored.

Accordingly, there is a need for a simple means to deliver advertising elements, i.e. logos, animations, sound, impressions, text, etc., without the annoyance of totally interrupting and intrusive content delivery, and without the passiveness of ordinary banner and frame advertisements which can be easily ignored.

OBJECTS AND SUMMARY OF THE INVENTION

It is thus a general object of the present invention to provide a means for delivering online advertisements which are unintrusive and which are not easily ignored by a user.

A more specific object of the present invention is to provide a server system for modifying a cursor image to a specific image displayed on a video monitor of a remote user's terminal.

It is another object of the present invention to provide a server system for modifying a cursor image to a specific image displayed on a video monitor of a remote user's terminal for the purposes of providing on-screen advertising.

It is a further object of the present invention to provide a means for providing on-screen advertising transmitted online which does not interrupt the delivery of content and which is aesthetically appealing and which affords the advertiser a great degree of unintrusive exposure.

It is still a further object of the present invention to provide a system and a method for causing a remote user terminal to display a cursor image as specified by a server terminal.

It is also an object of the present invention to provide a system and method for causing a remote user terminal to display a cursor image as specified by a server terminal, wherein the cursor image corresponds to the content retrieved by the user terminal.

It is a further object of the present invention to provide a system and method for causing a remote user terminal to display a cursor image such as a corporate name or logo, a brand logo, an advertising or marketing icon or slogan, an animated advertising image, and a related audio clip, that relate to an advertisement, such as a banner advertisement, that is included in the information content being retrieved by the user terminal.

It is an additional object of the present invention to provide a means for changing a cursor's appearance by sending data and control signals from a remote computer so that the cursor or pointer's appearance is associated with a portion of, or the entire content being displayed on the user's screen.

It is still an additional object of the present invention to provide a means for changing the appearance of a computer's cursor or pointer by sending data and control signals from a remote computer so that the cursor or pointer's appearance is associated with advertising messages.

These and other objects of the invention are realized in various embodiments of the present invention by providing a system for delivering advertising elements online without the annoyance resulting from the interruption of content delivery and without the passiveness of ordinary banner and frame advertisements which can be too easily ignored or bypassed or removed. An exemplary embodiment of the present invention is directed to a system that provides online advertising content using the on-screen cursor which is generally controlled by an input of positioning device known as a "mouse" or "mouse pointer". Nearly all online computer interfaces utilize a wired or remote control positioning device such as a mouse or roller or track ball which controls the cursor's movement on the screen. It is the cursor controlled by the mouse or positioning device which a user uses to "navigate" or move the cursor over objects, buttons, menus, scroll bars, etc., which appear on-screen and then clicking or in some cases double-clicking in order to activate a screen or task, or to commence an application or some function.

As a result of the prevalence of the use of the mouse, by many millions of users of online systems, a great deal of time is spent focused on the icons which represent the cursor or pointer as it may appear in some cases. Presently, pointer icons change from application to application and can also change within an application depending upon where on the screen the pointer is located, what state the computer exists in at a given moment, and what tools are being used, among other factors. Generally, pointers change shape to reflect an internal state of the computer or the present function within an application. While it is not new for pointers and cursors to change shape, pointers are not presently used to convey advertising. In conventional systems, the appearance of the cursor or pointer does not change to correspond with on-line content being displayed on the screen.

The present invention provides a means for enabling cursors and pointers to change color, shape, appearance, make sounds, display animation, etc., when the user's terminal or computer, known as the "client" or "user" terminal, which has a network connection, receives certain instructions from a remote or "server" computer attached to the network. In an exemplary embodiment of the present invention, the generic cursor or pointer icons used in many networking applications, such as black arrows, hands with a pointing finger, spinning wheels, hourglasses, wristwatches, and others, will change appearance, and in some cases may incorporate sound or animation, in a way that is linked and related to the content, such as a web page, which is being transmitted to and displayed on the client computer. The cursor or pointer may appear as a corporate or a brand logo which relates to advertising content within the web page being transmitted and displayed. The cursor or pointer image may also appear in a specified shape or color that is intended to convey a message that relates to the advertising content within the web page being transmitted and displayed.

An exemplary embodiment of the present invention comprises a combination of hardware and enabling software residing on the transmitting (server) computer or network server and/or on the receiving (client or user) computer or terminal which brings about the stated effect of enabling a computer's cursor or pointer to change appearance and in certain cases provide sound and animation which is linked and related to the content being transmitted to and displayed on the client computer or terminal. The transmitting computer and receiving computer or terminal advantageously include a processor, an operating system (OS) loaded thereon, a video monitor used to display a graphical user interface (GUI) and a Hypertext Transfer Protocol (HTTP) compliant web browser capable of loading and displaying hypertext documents transmitted over the Internet, although the invention is not limited in scope in that respect. For example, the receiving terminal may be any device that is able to communicate with a remote server, such as a user computer terminal, a user dumb terminal, or a television based system, such as a Web TV® terminal and other devices.

Preferably, coded information for bringing about the change in appearance of the cursor are embedded within the web page being loaded and viewed. In one embodiment of the present invention, the web page is written in Hypertext Markup Language (HTML) which is one of the most common standard page description languages used to develop web pages. Typically a web browser retrieves a web page to be loaded on a user's terminal. The retrieved web page in accordance with one embodiment of the invention contains a set of predetermined instructions referred to herein as cursor display instructions. The browser or browser extension interprets the information contained in cursor display instructions and instructs the operating system of the user's terminal via an application programming interface (API) to check its memory to determine if the user terminal is capable of loading the coded image, animation, and/or soundbite. If the image, etc. has been previously cached in the client computer memory, the cursor display instructions instruct one or more of the many devices controlled by the operating system in the user's terminal, such as the video monitor and audio speakers to display the desired images, animation and play desired sounds. If the image, etc. has not been previously cached in the client computer's memory, the browser or browser extension retrieves the information corresponding to the desired image from a remote server.

The present invention may serve to enhance banner advertisements which appear on a web page so as to remind users which company is sponsoring the particular page being viewed and to draw the user's attention to the banner advertisement. The present invention can also serve as a stand-alone branding vehicle as part of a "ubiquity campaign" to generate massive impressions among an audience of online users or can be simply used to make web sites more entertaining by providing animated, colorful cursors which may incorporate sound and/or animation, and which are configured so as to connote a relationship with the topic or subject of the web site.

The foregoing sets forth certain objects, features and advantages provided by exemplary embodiments of the present invention. Other objects and features of the present invention will become apparent from the following detailed description considered in conjunction with the accompanying drawings. It is to be understood, however, that the drawings are designed solely for the purposes of illustration and not as a definition of the limits of the invention, for which reference should be made to the appended claims.

DETAILED DESCRIPTION OF THE DRAWINGS

In the drawings in which like reference characters denote similar elements throughout the several views:

FIG. 4 illustrates a portion of the Cursor Display Instructions which is referenced as a resource within an HTML document according to one embodiment of the present invention;

FIG. 5 illustrates a set of exemplary codes that cause the user terminal's cursor to be modified, then revert to its original shape in accordance with one embodiment of the present invention;

DETAILED DESCRIPTION OF THE PRESENTLY PREFERRED EMBODIMENT

Figure 1:
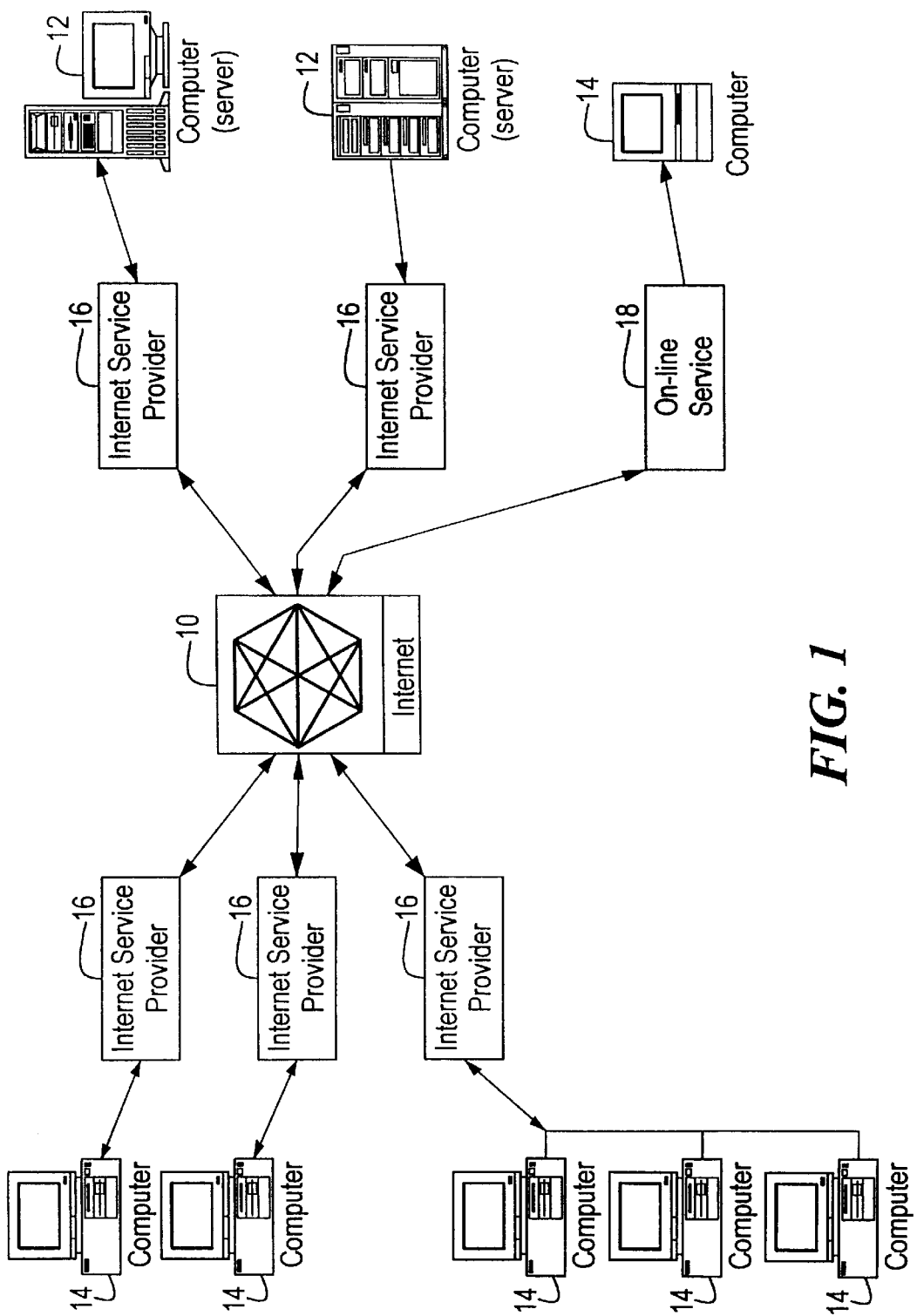
FIG. 1 illustrates a diagrammatic representation of a computer network illustrating the interconnection of a plurality of computers in which the present invention is implemented.

FIG. 1 illustrates a computer network, such as Internet 10, based on the client-server model. Internet 10 comprises a worldwide network of computers known as "servers" 12 which are accessible by "client computers" or "user terminals" 14, which are typically used by individual users or comprise a collection of personal computers interconnected via a Local Area Network or LAN, which are capable of accessing the Internet via a private Internet service or access provider (ISP) 16; such as the AT&T Worldnet Service® or the IBM Global Network®, or via an online service provider 18, such as America Online®, Compuserve®, the Microsoft Network® or Prodigy® (to name the most popular online service providers). One of the most common applications of the Internet is to support the World Wide Web ("WWW" or "the web"), which is a collection of servers on the Internet that utilize the Hypertext Transfer Protocol (HTTP), a known application protocol that facilitates data exchange between client and server and provides users or clients 14 access to files which can include text, graphics, sound, video, etc., using a standard page description language referred to as Hypertext Markup Language (HTML).

Each client computer 14 as indicated in FIG. 1, includes a "web browser" or browser loaded on the client computer's hard drive 21. A browser is a common software tool which allows graphical user interface (GUI)-based access to Internet network servers 12 through Internet Service Providers, ISPs, 16 or online service providers 18. A server 12 functions as a so-called "web site" which supports and maintains a plurality of files in the form of documents and pages. A Uniform Resource Locator or URL identifies a specific network path to a server 12 or some resource located on that server which has a known syntax for defining the network connection. The fundamental intrinsic capabilities of the browser are: (1) the ability to communicate with other computers using HTTP, and (2) the ability to process and present HTML documents to the user via a graphical user interface, GUI.

Recent versions of most browsers provide a plethora of other features beyond these two capabilities. For example, to increase its flexibility, the browser's intrinsic capabilities may be further extended through the use of software components, often called "controls" or "plug-ins". While the intrinsic capabilities of the browser are linked at compile-time ("statically"), the code which implements the capabilities of the control or plug-in component is linked with the browser's code at run-time ("dynamically"). By supporting these components through standard interface definitions, the browser's capabilities can be extended in ways never anticipated by its original manufacturer.

Another type of flexibility is offered when the browser implements some sort of command interpreter which is capable of interpreting and executing a code stream at run-time. In this case, the browser acts as a sort of "virtual machine" whose run-time behavior is completely governed by the code stream which it processes. The total scope of capabilities which can be realized with this approach is defined by the set of operations supported by the command interpreter.

Individually and collectively, these mechanisms provide a powerful and flexible platform which supports a wide range of Internet-based applications. Currently, some of the emerging standards govern the operation of these mechanisms, although the invention is not limited in scope in that respect. For example, Microsoft has created an interface definition for Windows "dynamic link libraries" and for ActiveX software components. Sun Microsystems has defined a software component model called JavaBeans. Sun has also created a virtual machine architecture and language called Java, which is supported via a variety of commercially available compilers. While a Java compiler translates source code into pseudo-code output called an "applet", which is in turn processed by the Java virtual machine, Microsoft, Sun, and others have also defined a set of HTML scripting languages whose source code is embedded directly in an HTML page. Microsoft's VBScript, JScript and Sun's JavaScript are examples of these embedded scripting languages.

The standard web page description language, HTML, provides basic document formatting and permits the web site developer to create and specify "links" or "hyperlinks" to other servers and files. Obtaining a web page or connecting to a web site requires the specification of a URL using an HTML-compliant client browser. After specifying the URL, client computer 14 initiates a request to server 12 identified in the link and connects to the web site and receives a web page. The request by client computer 14 to server 12 via the link is advantageously communicated via a TCP/IP (Transfer Control Protocol/Internet Protocol) communication, although the invention is not limited in this respect and other network connections or Internet protocols may be used.

Although an exemplary embodiment of the present invention is described based on the arrangement illustrated in FIG. 1, it is noted that the invention is not limited in scope in that arrangement and other types of system connections may be employed. For example, a plurality of user terminals may be connected to an online provider via dedicated communication channels, such as telephone lines. In accordance with this embodiment, the server system provides certain information that causes the cursor image on the video monitor of the user terminal to display an image as specified by the server system. As a result, the server system remotely defines and manages the shape and appearance of the cursor image in accordance with a pre-specified condition. The shape and appearance of the cursor image may correspond to the actual content of the data being provided to the user. Furthermore, regardless of the actual content of the data being provided to the user, the shape and appearance of the cursor image may be specified by the server system such that a plurality of user terminals at a desired point in time receive appropriate instructions to display the specified cursor image.

Figure 2:
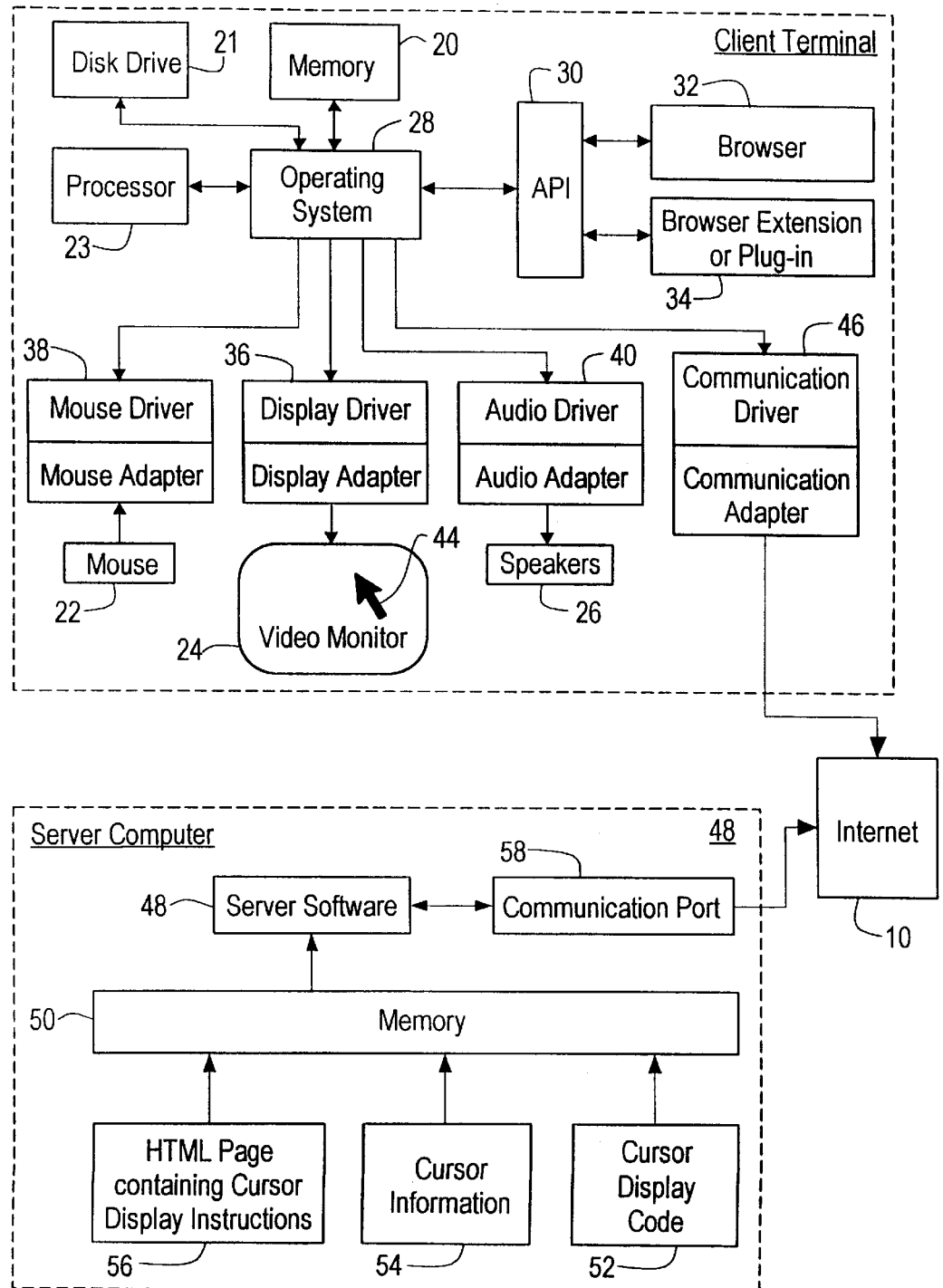
FIG. 2 illustrates a client-server computer network supporting the hardware and software of the present invention.

FIG. 2 provides a block diagram of hardware and software which is representative of a client-server network system connected via the Internet according to one embodiment of the present invention. The user or client computer or user terminal 14 typically includes a number of hardware components and software subsystems which cooperate to deliver the wide range of capabilities demanded by a modern computer application or program. These include not only the basic computational processor 23 and memory 20, but also a variety of input and output devices such as the keyboard (not shown), mouse 22, video display monitor 24, audio speakers 26, non-volatile storage such as a hard drive 21 and network communications systems 46 such as a modem among other devices. User terminal 14 is controlled via an operating system ("OS") 28 which serves to organize all the disparate elements within the computer 14 and expose them in a consistent and organized way to a program which may need some or all of these capabilities. The interface between a program, which is generally loaded within the computer's memory 20, and the systems under the control of the operating system 28 is commonly referred to as the Application Programming Interface ("API") 30, which is essentially a library of functions which the program ("application") can invoke when it needs to interact with any of these hardware subsystems.

As illustrated, user terminal 14 contains a browser 32 loaded within the computer's memory 20, and is adapted to communicate with a browser extension or browser plug-in 34, both which are adapted to communicate with the operating system 28 via the application programming interface API 30. As illustrated, operating system 28 is supplemented by a set of "drivers" which control and provide the operating system 28 with access to peripheral devices which are a part of user terminal 14. The drivers include display driver 36 which controls and provides the operating system 28 with access to the cursor image or pointer 44 projected on video display monitor 24, a mouse driver 38 which controls and provides the operating system 28 with access to mouse 22, an audio driver 40 which controls and provides the operating system 28 with access to speakers 26. Operating system 28 is configured to provide animated images to the video monitor. Furthermore, in accordance with another embodiment of the invention, the display driver may be configured to provide animated images to the video monitor. Operating system 28 also provides access to a communication port 46 such as a modem which serves as a communication interface to the Internet 10.

With continued reference to FIG. 2, user terminal 14 is connected to Internet 10 via a modem or some other communication interface such that information may be transmitted between user terminal 14 and Internet 10 via communication lines such as telephone cables or fiber optic networks, among other types of transmission systems. Internet 10 is also connected to numerous network servers, such as a simplified representation of a WWW server which is indicated as 48. Server 48 is provided with memory 50 into which the contents of certain data files are loaded. Such data files, among others, include Cursor Display Code 52, Cursor Information 54, and an HTML page containing Cursor Display Instructions 56, all of which are discussed in greater detail herein below. As illustrated in FIG. 2, these data files 52, 54, 56 are shown residing on the same server computer. However, the interconnected nature of the WWW allows these data files 52, 54, 56 to exist anywhere on Internet 10 For example, files 52 containing cursor display codes may be stored in various server systems, while files 54 containing cursor information may be stored in the same or other server systems, and files 56 containing HTML pages containing cursor display instructions may be stored in the same or yet other server systems.

In operation, WWW server 48 includes software which recognizes file requests received from WWW clients or users by communication port 58 and fulfills these requests by retrieving data stored in data files, i.e., Cursor Display Code 52, Cursor Information 54, and an HTML page containing Cursor Display Instructions 56.

One of the characteristics of most recent software systems is the graphically oriented user interface (GUI) which is viewable on video monitor 24. This graphical user interface helps to organize and filter the vast quantities of information which is accessible in a user terminal 14. Fundamental to the graphical user interface is the pointing device, generally mouse 22 which allows the user to manipulate or input information into the user terminal 14. Movement of mouse 22 is monitored by user terminal 14 which translates this movement into a corresponding movement of cursor 44 viewable on video monitor 24. As such, operating system 28 may expose, as some subset of its API 30, a set of functions which can be used to control aspects of the behavior and/or appearance of cursor 44.

By combining the capabilities of browser extensions, such as indicated by 34 in FIG. 2, with the capabilities to modify cursor 44, it is possible for a WWW server, such as that indicated by 48 in FIG. 2, to control the display characteristics of cursor 44 displayed on video monitor 24 of the user's computer 14. By doing so, a cursor control arrangement is established which is capable of delivering information which supplements, enhances, or is completely independent of, other information transmitted from a server, such as indicated by 48, through traditional means as via a communications port 58. The basic conceptual components of such exemplary system for modifying cursor 44 comprises Cursor Display Code 52, Cursor Information 54, and Cursor Display Instructions 56, discussed hereinabove with reference to FIG. 2. Preferably, Cursor Display Code 52 comprises a set of instructions which are executed on the user terminal 14 and which interact directly with application programming interface 30 of the user terminal 14 and operating system 28 so as to accomplish the actual change of cursor 44. Cursor Information 54 is, advantageously, a set of data which identifies the actual cursor image or images and corresponding audio content if desired. In one embodiment of the invention, Cursor Display Instruction 56 includes data that convey information that is used by Cursor Display Code 52 to control drivers, such as 36, 40, 46, and to identify such things, which among others consist of: the physical location of Cursor Information 54, the format of its representation, the intended manner and duration of its display, and information pertaining to how (and for how long) any cached Cursor Information 54 should be stored.

In general, the fundamental elements of the process of changing cursor 44 displayed on video monitor 24 of user terminal 14 are as follows: Cursor Display Instructions 56 are initially embedded inside an HTML document, e.g. a web page. When browser 32 of the user terminal 14 encounters Cursor Display Instructions 56, Cursor Display Code 52 is retrieved then invoked. As part of the invocation, the browser passes to the Cursor Display Code coded information sufficient to specify the manner of the display. Cursor Display Code 52 then retrieves Cursor Information 54 either from within memory 20 of user terminal 14 or from storage at a remote site and then causes the Cursor Information to interact with the display system, such as display driver 36, of user terminal 14 via the application programming interface 30 of operating system 28. This interaction causes Cursor Information 54 to be accessed by the display driver 36 in order to accomplish the intended effect, e.g., the change or transformation of cursor 44 visible on video monitor 24, and a corresponding sound information may be heard on speakers 26.

FIG. 4 illustrates the Cursor Display Instruction as a resource within an HTML document which is retrieved from a remote server. The Cursor Display Instructions as shown in FIG. 4 are written for ActiveX® technology, although the invention is not limited in scope to that technology. Among the information included within this resource definition is an identifier of the Cursor Display Code (the ActiveX® control), and the ActiveX® control's physical location on the Internet. This information is listed in lines 202–205 which generally identifies the Cursor Display Code. Line 204 of the Cursor Display Instruction is an identifier which comprises a globally unique name, often called a "Class ID", and which allows a particular ActiveX® control to be distinguished from all other ActiveX® controls, such that the wrong ActiveX® control is prevented from being utilized or retrieved. The remainder of the Cursor Display Instruction listed in lines 206–224 include the ActiveX® parameters or argument list as discussed hereinafter with reference to FIG. 3. The argument list includes parameters which provide information such as the type of cursor image (line 206), where the image can be retrieved from if not already resident on the user computer (line 207), where usage statistics are to be transmitted to (line 208), how long a changed image should remain before reverting, if at all, to the initial image (line 209), whether the cursor image is cached in the user terminal (line 210), whether the transmitting server is authorized to send cursor display instructions (line 211), the dormant delay duration (line 212), the URL of a file which specifies cursor trajectory path (line 213), the URL of a file which specifies how the cursor's shape should change based on its location on the screen (line 214), the URL of a file which specifies how the cursor's shape should change based on its velocity (line 215), the URL of a file which specifies how the cursor's shape should change based on modifications to the mouse button or keyboard state (line 217), specification of the type of modification intended (line 218), specification of the priority of intended modification (line 219), specification that the modifications will occur as a result of the transfer of a series of data files (line 220), the URL of a file which specifies the display of a satellite image that tracks the movement of the cursor image (line 221–223), and location of additional display instructions (line 224). It is noted that the invention is not limited in scope in this respect and other features may be included in the Cursor Display Instructions data.

Figure 3:
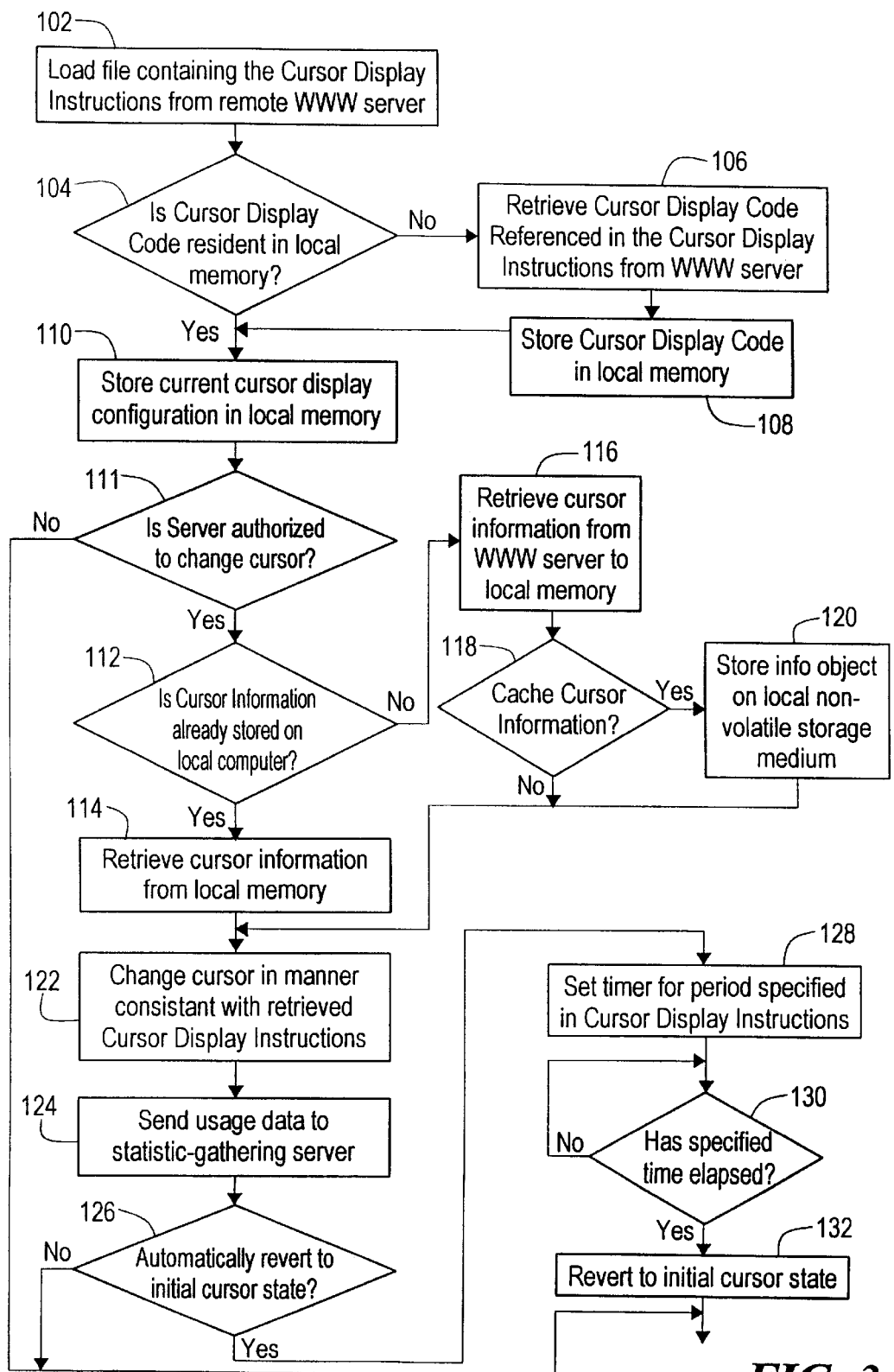
FIG. 3 illustrates a flowchart diagram of an exemplary method of the present invention for obtaining information from a remote site for modifying a cursor image and implementing such information at numerous user sites.

One embodiment of this method in accordance with the present invention is set forth in greater detail in the flowchart illustrated in FIG. 3. This embodiment is discussed with reference to the use of ActiveX® technology currently promoted by the Microsoft Corp. The ActiveX® technology provides a mechanism for defining the format of Cursor Display Instructions 56, for defining, identifying, and in some instances dynamically retrieving Cursor Display Code 52, and for implementing the interaction between Cursor Display Instructions 56 and the Cursor Display Code 52 as previously described. Although the flowchart in FIG. 3 is discussed with reference to ActiveX® technology, the invention is not limited in this respect, and other technologies for use with browser extensions or "plug-ins" may be utilized in accordance with various embodiments of the present invention as illustrated in FIG. 3. Furthermore, additional embodiments in accordance with the principles of the present invention may be incorporated within other application software employed in the user terminal. For example, the operating system or the browser itself may be configured to incorporate the mechanism for receiving and recognizing the Cursor Display Instructions and in return provide additional instructions for changing the image or appearance of the cursor display.

With reference to FIG. 3, in step 102, browser 32 of user terminal 14 retrieves an HTML file containing Cursor Display Instructions 56. The HTML file is retrieved when the user directs browser 32 to a remote WWW server site (such as, for example server 48 as indicated in FIG. 2) by specifying the uniform resource locator, URL, of the site on the Internet where the HTML file is located. When the HTML file is retrieved, it is loaded from the remote WWW server site at which point browser 32 of user terminal 14 begins its routine parsing of the HTML document and eventually encounters a reference to an ActiveX® control or some other information coded in an appropriate programming language such as Sun Microsystem Inc.'s Java® or VBScript®, which is embedded in the Cursor Display Instructions 56 within the HTML document. The Cursor Display Code is capable of interacting with the application programming interface 30 of operating system 28 for the purpose of performing the change, transformation or "swap" of cursor 44 as it is presently displayed on video monitor 24.

Upon encountering Cursor Display Instructions 56, browser 32 recognizes Cursor Display Instructions 56 as a request to invoke the particular ActiveX® control with a particular argument list or set of parameters as illustrated in FIG. 4. At step 104, browser 32 examines Cursor Display Instructions 56 and uses a unique class identification within the Cursor Display Instructions 56 to determine whether Cursor Display Code 52 (ActiveX® control) is already resident within local memory 20 of user computer 14.

If the Cursor Display Code 52 is not resident in local memory 14, generally in the form of a browser extension or plug-in 34, or if local memory contains an obsolete version of Cursor Display Code 52, browser 32 attempts, at step 106, to retrieve the ActiveX® control from a remote server on the Internet and store the Cursor Display Code in local memory 20 of user terminal 14 at step 108. With reference to FIG. 4, these steps correspond to lines 202–205.

Cursor Display Code 52 retrieved in step 106 may be client-platform specific and may also be browser specific such that browser 32 may transmit specific details to the remote server so that the remote server can deliver the appropriate Cursor Display Code 52.

In accordance with another embodiment of the invention, browser extension or plug-in 34 may be configured such that it can recognize Cursor Display Instructions based on any one of the available technologies, such as Active X, JavaBeans, JavaScript or VBScript.

Furthermore, it is understood that data compression techniques may be used in order to reduce the amount of network traffic involved in the transmission of data over the Internet.

After Cursor Display Code 52 has been recognized by user terminal 14 as at step 104 or retrieved and loaded therein at steps 106 and 108, operating system 28 is queried to determine the current cursor display configuration and this information is temporarily cached in local memory 20 of user terminal 14 at step 110 so that the cursor configuration may eventually be restored to its original state. Before any changes are made to cursor 44, the system at step 111 determines whether server 48 is authorized to change cursor 44. If authorization is not confirmed, no changes to cursor 44 transpire.

Step 112 is the first step which is executed from within the code of the ActiveX® control. At step 112, the ActiveX® control determines whether the image specified (Cursor Information 54) in the ActiveX® argument list which is to become the new cursor image exists in local memory 20 of user terminal 14. If the specified image in the ActiveX® argument list exists in local memory 20, it is retrieved therefrom at step 114. An additional argument in the ActiveX® argument list (line 207) identifies the location of this data on a remote server. If the specified image does not exist in local memory 20, this data is utilized by the ActiveX® control to retrieve Cursor Information 54 at step 116 from the specified location.

At step 118, an additional argument added within the ActiveX® control can be used to determine whether and for how long Cursor Information 54 should be cached in local memory 20. At step 120 Cursor Information 54 is cached in local memory 20. At step 122, the cursor is caused to change in the manner consistent with the retrieved Cursor Display Instructions 56. In an alternative embodiment, an additional step may be included which provides the user with the option of saving and storing the retrieved Cursor Information 54 in the computer's permanent memory on hard drive 21 even after the retrieved cursor is displayed. Storing the retrieved Cursor Information 54 in the computer's permanent memory saves time on the next occasion when the user loads a web page which requires the same cursor since the cursor is already stored within the computer's memory and need not be retrieved from a remote server.

Cursor Display Instructions 56 cause the invocation of an operating system function which causes the cursor to be displayed on video monitor 24. More specifically, the ActiveX® control invokes the application programming interface 30 of operating system 28 which causes the cursor image displayed on video monitor 24 to change to the form intended as recited in the argument list. The changed cursor is not limited to image, and may also include animation as well as sound. It should also be appreciated that most computers utilize a multitude of cursor images depending upon the application and task which is being run on the computer. The invention is not limited to changing only a single cursor image and any and all cursor images controlled by the computer's display driver 36 may be caused to change.

At step 124 the ActiveX® control may send usage information to a particular remote server as coded in Cursor Display Instruction 56 or Cursor Display Code 52. This information can be used to calculate the usage statistics of particular cursor images or cursor information and the context in which they are retrieved and viewed by users. In this particular embodiment, this information is conveyed as a data file transmitted to the remote server via HTTP. The invention is not, however, limited in the type of information and/or statistics which may be transmitted to the server, nor is the invention limited to being conveyed via HTTP as those skilled in the art will understand that such information may be conveyed via other transfer protocols. With reference to FIG. 4, this step corresponds to line 208. Additionally, the information may contain an identifying code for the server which issued the web page which contained the Cursor Display Instructions. This information could be used, for example, to verify that the issuing server has been granted the appropriate license to use the technology, by comparing a list of authorized servers or through digital signature validation.

In accordance with one embodiment of the present invention, the licensing arrangement is described in more detail, hereinafter. It is noted that licensing enforcement of the cursor display technology could be accomplished in several ways, and the invention is not limited in scope in that respect. As discussed previously, the server that transmits a web page may include the identity of the server in the form of a server ID within the Cursor Display Instructions. The user terminal then transmits the server ID to another server that among other things functions as a licensing body ("Licensing Body") so as to authenticate the server that transmits the web page as a valid licensee. Should this authentication fail, the execution of Cursor Display Instructions may not occur. In an alternative implementation, the execution of Cursor Display Instructions may be allowed to execute even if the issuer fails authentication. Such an infraction could be logged by the Licensing Body for use in enforcement through traditional channels. For performance reasons it may be desirable to collect the usage information for a plurality of Cursor Display Instructions as the user accesses multiple servers, and transmit the collection of information in batch form to the Licensing Body.

An alternative embodiment would involve the inclusion of an encrypted authentication code within the Cursor Display Instructions, as illustrated in line 211 of FIG. 4, or via a separate exchange of data between the client and server. In order to ensure that this code could not be re-used by other, non-authorized sites, it could for example be derived from the server's IP address, the date and time at which it is generated, the argument list, or some other information that is accessible to the client. Another possibility would involve the transmission of a unique or pseudo-unique code, from the client to the server. Upon receipt of this authentication code, the client would perform a decryption and verify its authenticity. Under such circumstances, the server software could be augmented with an Authentication Code Module supplied by the Licensing Body which generates and encrypts this code. The mechanism by which this augmentation could occur is similar to that discussed previously in the context of extending the client browser. For example, the server software could be modified and statically linked to the Authentication Code. Alternatively, it could be dynamically linked at run-time. Another alternative would be to implement the Authentication Code as its own process on the server and facilitate an inter-process communication protocol such as the Common Gateway Interface ("CGI").

At step 126, an ActiveX® control argument is used to determine whether the changed cursor should revert to its initial configuration. If it is intended to revert the changed cursor to its initial configuration, the reversion is paused at step 128 for a specified time period. After it is determined at step 130 that the specified time period has lapsed, the changed cursor reverts to its original configuration at step 132.

Whether the cursor is caused to revert to its initial configuration is of concern to many users so as to ensure that the user's computer configuration is not permanently altered as a result of the process of changing the cursor. As such, additional alternative measures may be added into Cursor Display Instructions 54 such that the changed cursor could be restored to its original configuration when the ActiveX® control is loaded or unloaded, when the computer starts up, is rebooted or is shut down, when the browser is activated or shut down, when an animated cursor completes its animation sequence, when instructed by a remote server, or as a result of some user input such as setting an option in the browser or accessing another web page or site. An alternative to adding parameters to the Cursor Display Instructions would be to control the process of changing the cursor to its initial state by a control program downloaded by and executed on the client computer. An example written in VBScript and interacting with an ActiveX control is included in FIG. 5.

Additionally, one of the significant attributes of this embodiment is the manner in which Cursor Display Code 52 is retrieved from a remote server if it is not located in the computer's local memory. Since Cursor Display Code 52 may be operating system or browser specific, it may be necessary that the server with which the user computer 14 is communicating be informed by user terminal 14 of the specific type of Cursor Display Code 52 which is desired. In another embodiment of the invention, browser extension or plug-in 34 may be configured such that it can recognize Cursor Display Instructions based on any available technology such as Active X and JavaScript.

Figure 7:
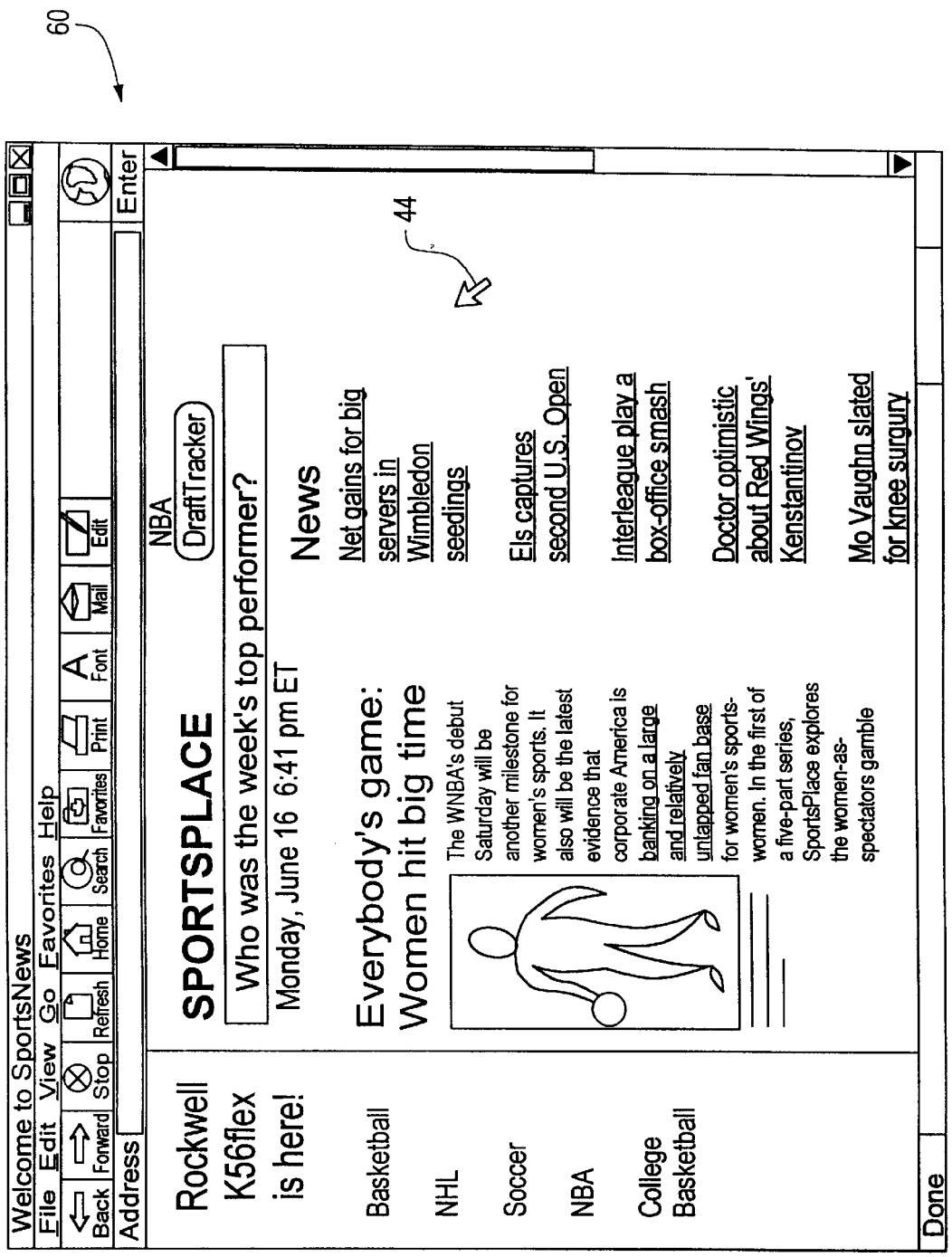
FIGS. 7–9 illustrate the appearance of a cursor prior to, during and after linking to a web page that contains cursor display instructions.
Figure 8:
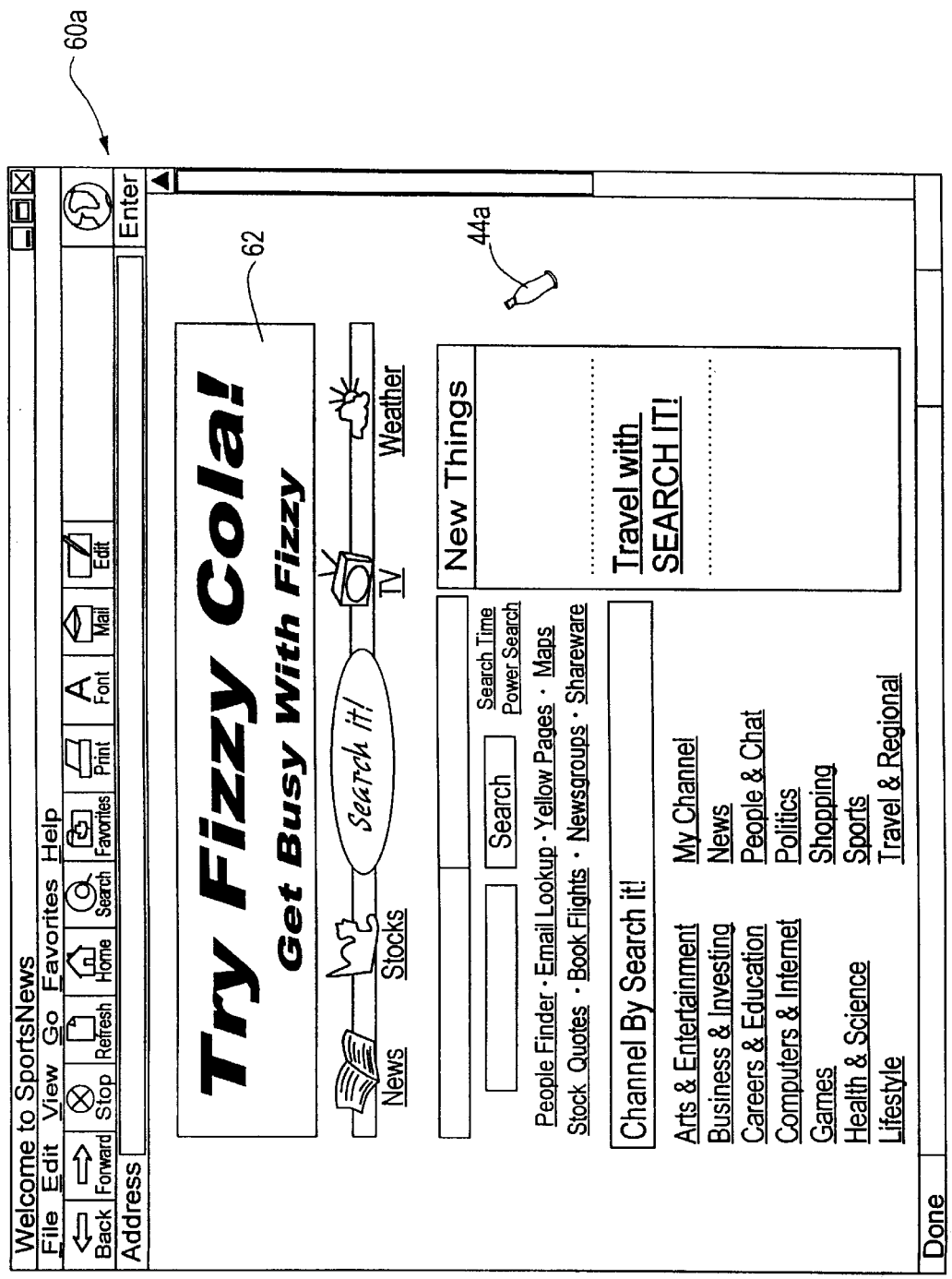
Figure 9:
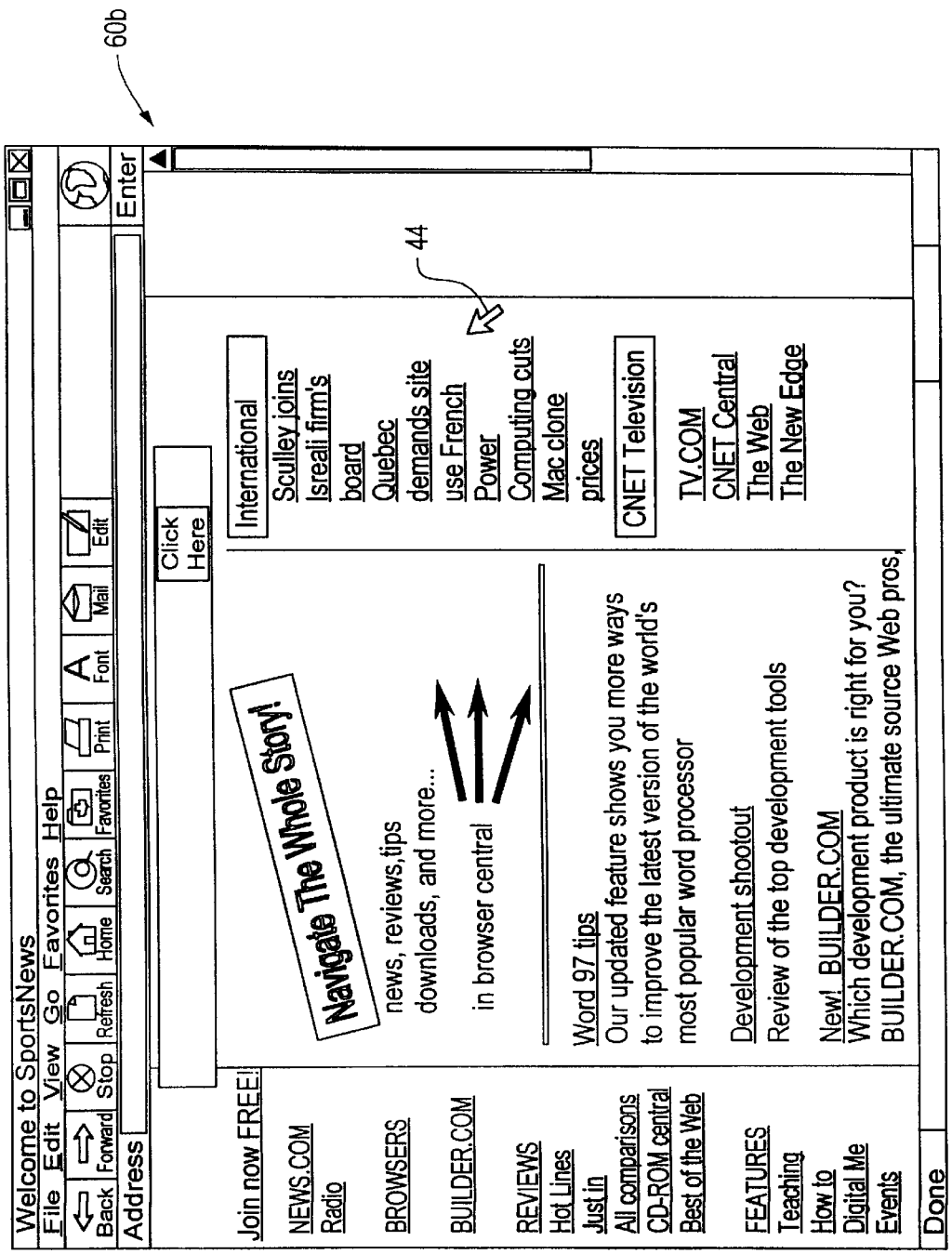

The operation of steps 102–132 as set forth in FIG. 3, may be illustrated pictorially in FIGS. 7–9. FIG. 7 illustrates an example of a typical web page 60 as it would appear on a user's video monitor 24 having the standard arrow cursor 44. In FIG. 8, there is illustrated a different web page 60a having a banner advertisement 62 for Fizzy Cola which contains Cursor Display Instructions. When web page 60a loads, the Cursor Display Instructions cause arrow cursor 44 to change into a Fizzy cola bottle shaped cursor 44a in conjunction with the Fizzy Cola banner advertisement. As illustrated in FIG. 9, if the user then loads a new web page 60b which is not provided with Cursor Display Instructions, the cola bottle shaped cursor of FIG. 8, reverts to the standard arrow cursor 44.

It is also understood that ActiveX® is but one of numerous technologies utilized over the Internet with which a user's computer may interact in bringing about the change or transformation of the cursor displayed on video monitor 24. Other implementations may utilize different technologies such as Windows dynamic link libraries, VBScript and JScript from Microsoft, as well as Java, JavaScript and JavaBeans from Sun Microsystems Inc. While these examples represent the dominant standards-based definitions, proprietary implementations could also be developed. Accordingly, while ActiveX® represents one embodiment of distributing and invoking Cursor Display Information 54 on a user's computer 14, it is to be appreciated that there are a variety of alternative implementations, and this particular implementation should not be considered a limitation of the invention. For example, alternative versions of browser 32 may encapsulate the appropriate operating system application programming interface call within their own code modules such that a browser extension 34 is not required.

In yet another embodiment of the invention the tasks described in steps 102 through 132 may be employed cooperatively between browser and browser extension or plug-in 34. Furthermore, browser 32 may employ a computational or processing engine such as an interpreter (as is the case with the Java® programming language, for example) which can extend the capabilities of browser 32 to a virtually unlimited degree.

It is also to be understood that in the course of carrying out the process of changing the cursor as discussed hereinabove, user terminal 14 may communicate with a multitude of remote servers as opposed to just a single server. For example, Cursor Display Codes may be retrieved from one remote server, Cursor Instructions may be retrieved from a second remote server, and the user terminal 14 may also be in communication with a third server to which it is transmitting the usage statistics.

Features identified in reference with FIG. 4 are described in more detail hereinafter. It is noted that in accordance with one embodiment of the invention, it may be desirable to modify the Cursor Display Code to improve its performance or enhance its capabilities. The server may transmit version information in the Cursor Display Instructions as illustrated in line 205 of FIG. 4. The Cursor Display Code could compare this information with its own version information in order to determine whether it has been rendered obsolete by a more recent version. If so, the Cursor Display Code could retrieve the current version from a remote server and invoke execution on the new version.

In an alternative embodiment of the present invention the position, as well as the image, of the user terminal's cursor may be controlled by a remote server. This embodiment would be implemented within the Cursor Display Code 52 such that additional information could be passed to Cursor Display Code 52 via Cursor Display Instructions 56. The additional information passed to Cursor Display Code 52 would contain code which indicates: (1) that the cursor position control is intended, (2) the conditions under which the cursor should be moved, and (3) the source of the data which specifies the particular movement that is intended. The latter could be stored in memory on a remote server and retrieved in a manner similar to retrieving Cursor Display Instructions 56 or the Cursor Display Code 52. For example, if no user input is received for a specified interval, the cursor image could change and the position of the cursor could be set such that it follows a specified trajectory for several seconds, then reverts to its original state as illustrated by line 213 of FIG. 4.

In accordance with another embodiment of the invention it is possible to vary the modification to the cursor as a function of cursor position. For example, the cursor pointer could be controlled such that it "points" to a specific location on the screen regardless of the cursor's location on the screen as illustrated in line 214 of FIG. 4.

In accordance with another embodiment of the invention it is possible to vary the modification to the cursor as a function of cursor velocity. For example, the cursor image could change from a stationary bird to a bird with flapping wings only when the cursor is moved quickly across the screen as illustrated in line 215 of FIG. 4. Furthermore, it is possible to vary the modification to the system-level user interface attributes as a function of mouse button state or keyboard state. For example, the image of a cube could be replaced with that of a jack-in-the-box when the mouse button is depressed.

Figure 6:
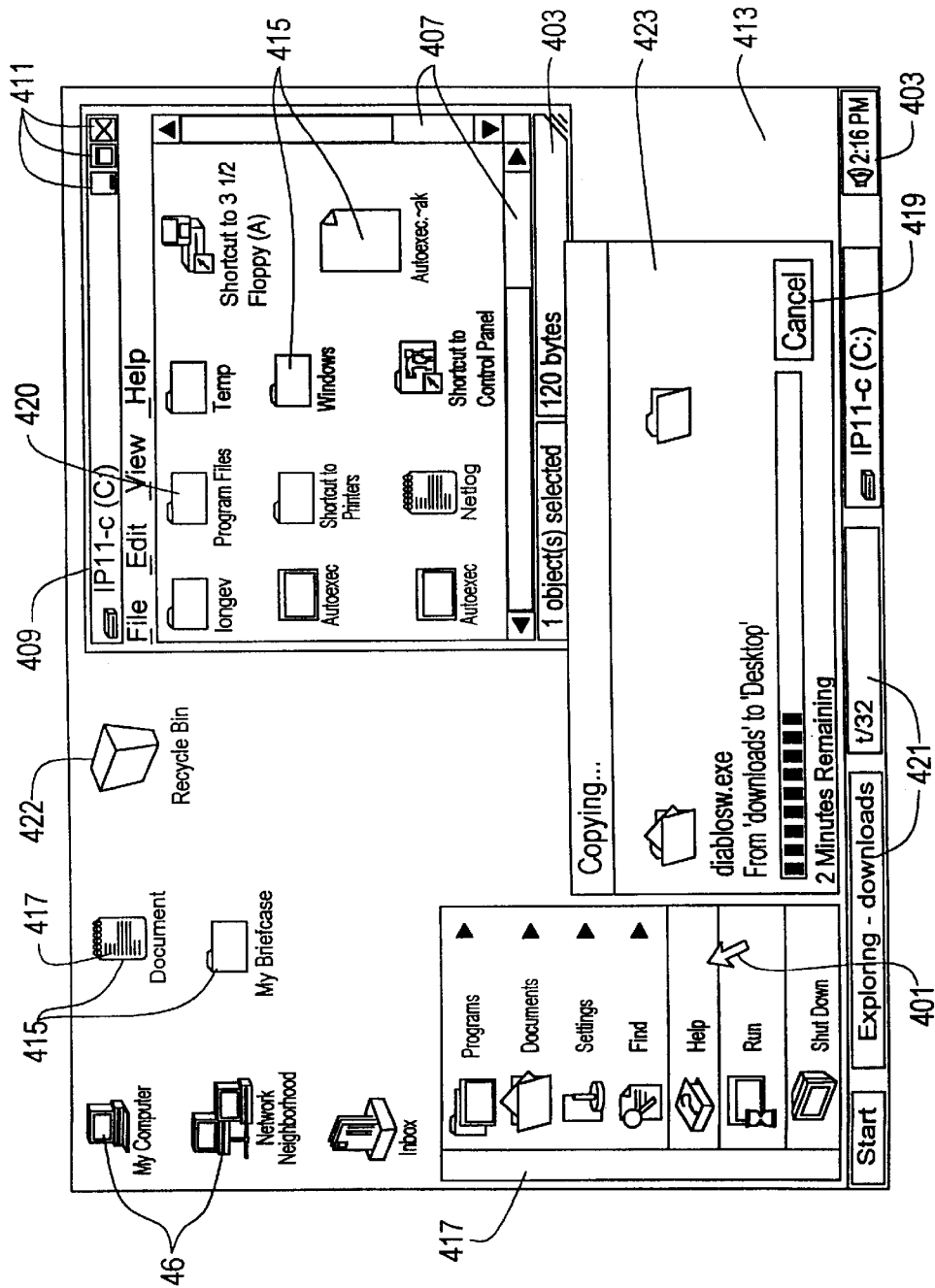
FIG. 6 illustrates a plurality of user interface attributes that may be remotely modified in accordance with one embodiment of the present invention.

In accordance with another embodiment of the invention, it is possible to modify other "system-level" attributes of the client computer's user interface, hereafter called "system-level user interface attributes". These attributes, as illustrated in FIG. 6 are typically under the control of the operating system and, as such, they exist independently of the user "applications" (programs) and data which are stored on the computer and interact with that operating system. User applications interact with the operating system to deliver the computer's functionality to the user. Examples of user applications include word-processors, spreadsheets, web browsers, games, etc. The operating system may contribute certain user interface elements to the user interface of the applications running on it.

Because many of these attributes are inherited from the operating system by all applications running on that operating system, applications tend to exhibit a degree of commonality in their user interfaces. Examples of these attributes include: the shape and color of the cursor 401, the shape and color of a status bar which displays current state information to the user 403, the shape and color of the scroll bar which indicates the relative position and scope of the displayed sub-image to that of the underlying larger image to the user 407, the shape and color of the title bar which displays current state information 409, the shape and color of icons representing standard window operations such as close, minimize display size, restore display size, etc. 411. Thus, these system level attributes may also be modified in response to Cursor Display Instructions data.

In addition, the operating system itself may have a user interface. Examples include: the images and sounds displayed when the computer starts or shuts down, the background image ("wallpaper") against which other graphical elements are displayed 413, file catalogs and file selection mechanisms 415, system icons 416, file invocation mechanisms 417, buttons 419, process selection mechanisms 421, etc. Further examples include the icons representing various system elements or information such as files 418, groups of files 420, files marked for deletion 422, as well as standard, information bearing "dialog boxes", such as cancel, warning, illegal operation, stop, accept, continue, etc. 423. The system may also support a set of audibly distinct waveforms which may be used to convey similar information to the user. These operating system user interfaces may also be modified in response to a Cursor Display Instruction data.

In yet another exemplary embodiment of the present invention a plurality of modifications to the system-level user interface attributes may occur simultaneously. For example, the cursor could animate while an audio waveform is playing, as the minimize display icon changes to a specific image.

A further feature of the invention is to accumulate information regarding the user's exposure time to various system-level user interface attribute modifications, and to vary the exposure to those modifications accordingly. For example, the client could transmit exposure data to the server and the server would select a version of the image based on that data. Furthermore, the exposure data could be transmitted as part of the usage statistics discussed previously.

Another feature of the invention is to monitor the load being placed on the client system by the user and schedule data exchange with the servers so that it occurs when it is least disruptive to the user's activities.

It is also possible to allow the user to control the level of interface modification he or she wishes to entertain. For example, the user could specify that only those modifications of specific types, as illustrated on line 218 of FIG. 4 or of specific priority should be delivered, or even that none be delivered, as illustrated at lines 218 and 219 of FIG. 4. This specification could be implemented directly by the user on the client system, or could be implemented through communication with a remote server.

In accordance with another embodiment of the invention it is possible to transmit the image and/or audio data which specifies the modification as a series of data files which are delivered in a continuous stream to the client, as illustrated at line 220 of FIG. 4. These files are exposed to the user before the complete set of data has been delivered, thereby providing the capability for the initiation of long animations or audio files before the entire quantity of data has been received by the client.

A further feature of the invention is to support the display of a "satellite" image which tracks the cursor's position on the screen. For example, the cursor image could be replaced with that of a mouse, and the image of a cat could be displayed near that mouse. When the cursor is moved, the satellite image moves accordingly at a specific offset, as illustrated at lines 221–223 of FIG. 4.

A further feature of the invention is to provide a mechanism for the user to quickly establish a connection with a specific server based on the specific user interface attribute modification which is in effect when the mechanism is invoked. For example, the user could press a specific key sequence on the keyboard and immediately jump to the web site related to the cursor image which is currently displayed.

In accordance with another embodiment of the invention, it is possible to convey additional detailed Cursor Display Instructions as a separate file which is explicitly retrieved from a server by the Cursor Display Code, as illustrated at line 224 of FIG. 4.

For each modification to the system-level user interface attributes, an appropriate set of display instructions must be transmitted to the client. These could take the form of additional parameters in the Cursor Display Instructions as discussed previously, or they could be represented within a code module which is received by and executed on the client. As discussed previously, Java, and its related technologies could be used for such a purpose, but use of these technologies should not considered a limitation of the invention.

It is noted that there are numerous ways in which a system-level user interface attribute modification is accomplished in accordance with the principles of the present invention. It is further noted that system level user interface attributes may be modified independently or in conjunction with cursor modification. Furthermore, the system-level user interface attribute modification may be related to specific information displayed on the rest of the user's screen (hereafter referred to as "specific information") in many different ways. Thus, the present invention is not limited in scope to how content providers may relate the system-level user interface attribute with the specific information. Rather, at least one of the goals of the present invention is to enable the content providers to modify the system-level user interface attribute whenever and wherever they see fit. For example, content providers may modify system-level user interface attributes at a remote user's terminal for advertising, entertainment, information delivery, celebrating an event, or other reasons, and therefore, the invention is not limited in scope in that respect. Furthermore, when a content provider elects to display a specified system-level user interface attribute in conjunction with and corresponding to specific information conveyed via the user's terminal, the cursor image and the background display data are deemed related.

Additional examples intended to illustrate some applications of the present invention are explained below, although the invention is not limited in scope to any one of these examples.

Thus, in accordance with one embodiment of the invention, a modified cursor might take the appearance of a "Fizzy Cola" bottle when a "Fizzy Cola" banner advertisement appears among the display data of a popular search engine's site. Similarly, the cursor can be modified for advertising purposes to represent Fizzy Cola's logo, its corporate mascot, images of its products or services, slogans, icons, brand images, advertising messages (the word "Thirsty?", for example), abstract suggestions (such as a straw or glass), etc.

Alternatively, Fizzy Cola, on its own site, or homepage, might have a picture of a bottle of Fizzy in the middle of the page (in the display data). A dynamic cursor image could then be used to show a person holding a straw in such a way that the straw always points from the user toward the top of the Fizzy bottle, no matter where the cursor moves on the screen. The straw, in this case, might be "attached" to the cursor image (part of the same image) or could be separate, "satellite" image, a "sprite," whose movement on the screen (in this case) is related to the movement of the cursor. Sprites, which can appear and disappear as desired, can enhance the invention by enabling the use of graphical elements which are associated with the cursor but which reside outside the limited cursor "space" (which in some systems may be, at maximum, 32 by 32 pixels). For the purposes of the invention, however, there should be no limitation to the size of the cursor.

Additional examples of modification to the cursor include rendering the cursor as a baseball bat (on a site with sports information), a pink but otherwise standard-shaped pointer (on a site about the Pink Panther), a witch-on-a-stick to celebrate Halloween, the Statue of Liberty to celebrate the Fourth of July, etc. All of the foregoing cursor images could be enhanced with related animations, such as the bat hitting the ball.

Similarly, the present invention can be used to replace not just the standard arrow but other standard cursors as well, such as the generic hand with pointing index finger (the icon commonly used in browsers to indicate that the pointer is positioned above a hot link). A site for children might, for example, replace this generic pointing-hand cursor with the pointing "paw" of a furry animal. A site dealing with horror movies might choose to replace this pointing hand with a bony skeleton-like hand.

Additional examples involve cursors with text or numbers. For example, the cursor might contain the text "Right-Click Now!" prompting users to click the right button of their mouse (where right-clicking on the mouse could, for example, trigger the delivery of a new page of display data). It may also be desirable in certain cases to put alphanumeric data in the cursor "space" to convey information to users, such as stock prices, baseball game scores, the temperature in Florida, etc. The data can be static, semi-static (i.e. updated periodically), or dynamic (updated frequently— possibly incorporating available streaming-data and data-compression technologies).

Use of associated sound, sprites, animations, and modified system display elements are provided as enhancements to the basic invention. For example, a Fizzy cola mascot could appear in the cursor space in conjunction with the speakers, attached to the user's machine, playing the sound of the mascot saying, "drink Fizzy!" Any time a content provider elects to incorporate said enhancements in conjunction with a new modified cursor image, the cursor image and said enhancements have been deemed related.

The present invention allows users to change cursor images; it also allows them to change them back. It may be desirable to revert the pointer to a previous or generic pointer image. Given the Fizzy Cola example above, if the page containing display data changes and there is no longer an advertisement for Fizzy, but rather an advertisement for its rival, Jazzy Cola, it may be desirable to ensure the removal of the Fizzy cursor image(s) and accompanying enhancements.

The foregoing examples are not intended to suggest limited uses for this invention; to the contrary, the examples are intended to illustrate the wide range of uses for this invention. The collective creativity of the online advertising, art, design, commerce, content publishing, and related industries will develop many novel and unforeseen ways to use the present invention. The versatility of the present invention should not be regarded as a limitation on its scope.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is to be understood that the drawings are not necessarily drawn to scale, but that they are merely conceptual in nature.

We claim:

1. A method for authenticating modification of a cursor image, comprising:

requesting specified content information from a first server system;

receiving said specified content information, said specified content information including at least one cursor display instruction, said cursor display instruction including authentication data;

transmitting, responsive to said specified content information, an authentication request to a second server system, said authentication request including said authentication data;

receiving, from said second server system, an authentication message indicating whether said first server system is authorized to modify said cursor image; and modifying, in response to said receiving of said authentication message from said second server system, in the event that said authentication message indicates that said first server system is authorized to modify said cursor image, said cursor image to a new cursor image, said new cursor image including content corresponding to at least a portion of said specified content information.

2. The method of claim 1, further comprising executing said cursor display instructions in the event that said authentication message indicates that said first server system is authorized to modify said cursor image.

3. The method of claim 1, further comprising preventing execution of said cursor display instructions in the event that said authentication message indicates that said first server system is not authorized to modify said cursor image.

4. The method of claim 1, further comprising executing said cursor display instructions in the event that said authentication message indicates that said first server system is not authorized to modify said cursor image, and logging an unauthorized request event at said second server system.

5. The method of claim 1, wherein said authentication data includes identification of said first server system.

6. The method of claim 1, wherein said authentication data includes an encrypted authentication code.

7. The method of claim 1, further comprising requesting said authentication data responsive to receipt of said specified content information.

8. A method for authenticating an operation which modifies a cursor image displayed by a client system, comprising:

requesting specified content information from a server system;

receiving said specified content information, said specified content information including at least one cursor display instruction, said cursor display instruction operable to modify an existing cursor image displayed by said client system, said cursor display instruction including an encrypted authentication code;

decrypting said encrypted authentication code;

determining whether to execute said cursor display instruction in response to said decrypted authentication code; and modifying, in response to said decrypted authentication code, in the event that said decrypted authentication code indicates that said server system is authorized to modify said existing cursor image, said existing cursor image to a new cursor image, said new cursor image including content corresponding to at least a portion of said specified content information.

9. The method of claim 8 wherein said authentication code is based at least in part on an identity of said server system.

10. The method of claim 9 wherein said identity of said server system is an IP address of said server system.

11. The method of claim 8 wherein said authentication code is based at least in part on a time at which it is generated.

12. The method of claim 8 wherein said authentication code is based at least in part on a date on which it is created.

13. The method of claim 8 wherein said authentication code is based at least in part on a value transmitted from said client system to said server system.

14. The method of claim 13 wherein said value is a unique code.

15. The method of claim 13 wherein said value is a pseudo-unique code.

16. A method for authenticating an operation which modifies a cursor image displayed by a client system, comprising:

requesting, by said client system, specified content information from a server system;

receiving, by said client system, said specified content information, said specified content information including at least one cursor display instruction, said cursor display instruction operable to modify an existing cursor image displayed by said client system;

requesting, by said client system responsive to recognizing said cursor display instruction, an encrypted authentication code;

decrypting, by said client system, said encrypted authentication code;

determining whether to execute said cursor display instruction in response to said decrypted authentication code; and modifying, in response to said decrypted authentication code, in the event that said decrypted authentication code indicates that said server system is authorized to modify said existing cursor image, said existing cursor image to a new cursor image, said new cursor image including content corresponding to at least a portion of said specified content information.

17. The method of claim 16 wherein said authentication code is based at least in part on an identity of said server system.

18. The method of claim 17 wherein said identity of said server system is an IP address of said server system.

19. The method of claim 16 wherein said authentication code is based at least in part on a time at which it is generated.

20. The method of claim 16 wherein said authentication code is based at least in part on a date on which it is created.

21. The method of claim 16 wherein said authentication code is based at least in part on a value transmitted from said client system to said server system.

22. The method of claim 21 wherein said value is a unique code.

23. The method of claim 21 wherein said value is a pseudo-unique code.

* * * * *

UNITED STATES PATENT AND TRADEMARK OFFICE
CERTIFICATE OF CORRECTION

PATENT NO. : 6,065,057
DATED : May 16, 2000
INVENTOR(S) : James Samuel Rosen et al.

It is certified that error appears in the above-identified patent and that said Letters Patent is hereby corrected as shown below:

<u>Title page,</u>
Item [75], Inventors, "Charlestown" should read -- Cambridge --.

Signed and Sealed this

Ninth Day of August, 2005

JON W. DUDAS
*Director of the United States Patent and Trademark Office*